United States Patent [19]
Stiles et al.

[11] 3,779,785
[45] Dec. 18, 1973

[54] FREE FLOWING WAX COATED PARTICULATE ETHYLENE-VINYL ACETATE COPOLYMERS

[75] Inventors: Claude J. Stiles, Tuscola; Joseph Fischer, Urbana, both of Ill.

[73] Assignee: National Distillers and Chemical Corporation, New York, N.Y.

[22] Filed: May 26, 1971

[21] Appl. No.: 147,252

[52] U.S. Cl........ 117/4, 117/100 C, 117/138.8 UA, 117/168
[51] Int. Cl............................................. B44d 1/02
[58] Field of Search.................. 117/100 C, 138.8 F, 117/168, 4, 138.8 E, 138.8 UA

[56] References Cited
UNITED STATES PATENTS

| 2,839,422 | 6/1958 | Beyer et al | 117/4 |
| 3,035,003 | 5/1962 | Kessler | 117/100 X |
| 3,108,017 | 10/1963 | Messwarb | 117/168 X |
| 3,306,882 | 2/1967 | Pullen et al. | 117/168 X |
| 3,400,092 | 9/1968 | Fox | 117/168 X |

Primary Examiner—William D. Martin
Assistant Examiner—Dennis C. Konopacki
Attorney—Allen A. Meyer, Jr.

[57] ABSTRACT

Particles of ethylene-vinyl acetate copolymers are coated with a low melting point hydrocarbon wax to render the particles tackless and free flowing. The wax is applied to the copolymer particles in an aqueous emulsion.

8 Claims, No Drawings

FREE FLOWING WAX COATED PARTICULATE ETHYLENE-VINYL ACETATE COPOLYMERS

BACKGROUND OF THE INVENTION

Particulate ethylene-vinyl acetate copolymers exhibit a tendency to stick together which increases as the vinyl acetate content of the copolymer increases. As a result, difficulties are encountered in further cutting, pneumatic conveying and packaging of the copolymer pellets. Polyethylene powder, which is an excellent thermoplastic parting agent, cannot be employed because of its deleterious effect on the end use properties of the resin, i.e., the high melting point of the polyethylene causes clouding of hot melt solutions of ethylene-vinyl acetate copolymers. It has now been found that a low melting point wax is a satisfactory parting agent and will not cause clouding of hot melt solutions, i.e., will not adversely effect the end use properties of the copolymers.

Blends of wax and ethylene-vinyl acetate copolymers are, of course, known. For example, U. S. Pat. No. 3,390,035 teaches a blend containing a minimum of 10 weight percent wax. However, such hot melt blends should not be confused with the present invention because at such high levels of wax content, the copolymers act as a binding agent for the wax in the end-use application. In the present invention, the wax acts as a parting agent to render the particulate copolymer free-flowing.

Accordingly, it is the object of this invention to provide a novel parting agent and method of application which will permit the cutting, pneumatic conveying and packaging of particulate ethylene-vinyl acetate copolymer which would otherwise tend to stick together, without adversely effecting the end use properties of the copolymer.

SUMMARY OF THE INVENTION

This invention relates to the handling of ethylene-vinyl acetate copolymers. More particularly, the invention relates to employing a low melting point wax as a parting agent for particulate ethylene-vinyl acetate copolymer, which wax can be applied to the copolymer from an aqueous emulsion during pelletization.

DESCRIPTION OF THE PREFERRED EMBODIMENTS

The present invention is generally applicable to ethylene-vinyl acetate copolymers containing about 45–72% ethylene and about 28–55% vinyl acetate. Copolymers containing less than about 28% vinyl acetate generally do not require a parting agent because they do not tend to stick together. The copolymers, per se, are well known and can be prepared by any conventional process. After polymerization, the copolymer is generally pelletized for ease of handling. The resulting particles or pellets can be any desired size and are usually about ⅛ inch.

The parting agent of the invention is a low melting point wax which is employed in the form of a finely divided aqueous emulsion. It is preferably employed with the ethylene-vinyl acetate copolymers having high vinyl acetate content, generally about 30–50 weight percent, because of the tendency to stick together increases with increasing vinyl acetate content. The melting point of the wax is generally about 150° to 260° F. and preferably about 200° to 230° F. The preferred waxes are Fischer-Tropsch waxes which are synthetic hydrocarbon waxes of very high molecular weight obtained as by-products in the synthesis of liquid fuels (gasoline and diesel oil) from carbon monoxide and hydrogen by the Fischer-Tropsch process. These synthetic waxes generally have melting points within the range of 150°–250° F. Other suitable waxes include paraffin wax which is a substantially colorless, hard, and translucent mixture of solid hydrocarbons that fall within the formula $C_{23}H_{48}$-$C_{35}H_{72}$; and microcrystalline wax which is obtained from the non-distillable still residues from the fractional distillation of petroleum and usually has a melting point of about 150°–200° F. Candelilla, ceresin and carnauba waxes can also be employed. If desired, mixtures of these waxes can be used.

The wax is employed in the form of a finely divided aqueous emulsion. In general, the wax particles have a size of about 0.1 to 1.0 microns and preferably about 0.1 to 0.5 micron. The finely divided low melting point wax emulsions are commercially available and can contain any of the emulsifying agents known in the art such as octylphenoxypoly(ethyleneoxy) ethanol, sodium dodecylbenzene sulfonate, sodium lauryl sulfate, olein morpholide and the like. The preferred emulsion employed in this invention is Nopcosize DS-101, a milk-white fluid having a pH of 8.5–9.5, 40% solids of 0.1–0.5 micron particle size Fischer-Tropsch wax having a melting point of 215° F., an oil content (MIPK) of 1% and an ASTM penetration at 77° F. of 1.5

The wax parting agent is applied to the ethylene-vinyl acetate copolymers from the aqueous emulsion at a temperature of about 32°–55° F., preferably about 35°–50° F. The concentration of the wax in the mixture of aqueous emulsion and copolymer is about 1–5% and preferably about 1–2%. If the concentration of wax is much below 1%, it will not act as a parting agent for the pellets and if the wax concentration is much above about 5%, the wax will separate from the water and will not coat. In the preferred process of this invention, the ethylene-vinyl acetate copolymer is cut, chopped or pelletized in a water environment and the finely divided wax is added to the water in an amount sufficient to provide the desired concentration. During continuous copolymer coating, the concentration of wax can be maintained by the periodic addition of finely divided wax.

The copolymer particles or pellets become coated with an effective parting agent amount of the wax in the finely divided, low melting point wax aqueous emulsion. This coating remains on the pellets when they are thereafter dried by conventional procedures. The resulting pellets have wax uniformly coated thereon and can be moved from the production equipment to storage containers by conventional pneumatic devices and can be stored for substantial periods of time without the pellets sticking together or agglomerating.

The following Examples are presented to further illustrate the invention but are not intended to limit it. Unless otherwise specified, all temperatures are in degrees fahrenheit and all parts and percentages are by weight throughout this specification and claims.

EXAMPLE 1

A copolymer of ethylene-vinyl acetate is prepared which has a vinyl acetate content of 31% and a melt index of 24. The copolymer is pelletized in a chamber containing a high speed blade which is attached to the perforated die plate outlet of an extruder. The resulting pellets are removed from the chamber by a stream of water in which Nopcosize DS-101 has been added in an amount sufficient to provide about 1.6% solids (wax) based on the mixture of aqueous emulsion and copolymer and thereafter maintained at about 1.2%–1.6% by periodic addition of Nopcosize. The coated pellets are thereafter dried and transferred to a storage container by means of a pneumatic conveyor. The pellets are free-flowing and easily transferrable. After the wax coated copolymer pellets have remained in storage for 90 days, they are still free-flowing.

EXAMPLE 2

Example 1 is repeated except that the ethylene-vinyl acetate copolymer contains 30% copolymerized vinyl acetate and has a melt index of 120. No sticking or agglomeration is noted after the wax coated copolymer pellets have been stored for 180 days.

EXAMPLE 3

Example 1 is repeated except that the ethylene-vinyl acetate copolymer contains 27.5% copolymerized vinyl acetate and has a melt index of 3. The coated copolymer pellets do not stick together when squeezed tightly. The coated pellets remain free-flowing and transferable after extended storage.

EXAMPLE 4

In this Example, the Nopcosize DS-101 emulsion (40% solids) is diluted with water to obtain 4% solids and added to the water of the cutter apparatus described in Example 1. The resulting concentration of the finely divided wax or solids is 1.0–1.5% based on the mixture of aqueous emulsion and copolymer. The concentration level of the wax is maintained at 1–2% solids by the periodic addition of Nopcosize DS-101. An ethylene-vinyl acetate copolymer containing 31% copolymerized vinyl acetate is pelletized in the cutter, dried and placed in a storage container. The coated resin remains free-flowing and transferable after 8 months of storage.

EXAMPLE 5

Example 4 is repeated except that the ethylene-vinyl acetate copolymer contains 35% vinyl acetate. The coated pellets do not stick together or agglomerate and can easily be removed from the storage containers after a period of more than 8 months.

EXAMPLE 6

Example 4 is repeated except that the ethylene-vinyl acetate copolymer contains 40% vinyl acetate. No sticking or agglomeration is noted and the resin can easily be removed from the storage container after a period of more than 8 months.

The foregoing pelletization is repeated except that no wax emulsion is employed. After storage for 2 weeks, the resin pellets have agglomerated and cannot be removed from the storage container.

EXAMPLE 7

Example 4 is repeated except that an emulsion of carnauba wax having a melting point of 180.5°–187° F. and a specific gravity of 0.996–0.998, used in place of the Nopcosize DS-101.

EXAMPLE 8

Example 4 is repeated except that an emulsion of ceresin, a mineral wax derived from ozocerite wax by refining and bleaching, and having a melting point of 160°–175° F. and a specific gravity of 0.88–0.935 is used in place of the Nopcosize DS-101.

Various changes and modifications can be made in the composition and process of the invention without departing from the spirit and scope thereof. The various embodiments disclosed herein serve to further illustrate the invention, but are not intended to limit it.

We claim:

1. A process of wax coating a particulate ethylene-vinyl acetate copolymer which comprises mixing said ethylene-vinyl acetate copolymer particles containing 28–55 weight percent vinyl acetate with an aqueous emulsion of a finely divided, low melting point hydrocarbon wax, in amounts such that the wax content in the copolymer/emulsion mixture is about 1–5 weight percent based on the mixture, whereby said particles become coated with said wax, drying the coated particles, and recovering the coated, particulate, flowable copolymer.

2. The process of claim 1 wherein the wax is a Fischer-Tropsch wax.

3. The process of claim 2 wherein the wax is present in a concentration of about 1–2 weight percent, the wax has a melting point of about 150°–260° F., and wherein the copolymer contains 30–50% copolymerized vinyl acetate.

4. The process of claim 3 wherein the wax has a melting point of about 200°–230° F.

5. A process for simultaneously cutting and coating ethylene-vinyl acetate copolymers containing 28–55 weight percent vinyl acetate with an aqueous emulsion of a finely divided low melting point wax which comprises introducing said copolymer into a cutter having a water environment which contains said wax in an amount sufficient to provide a concentration of about 1–5 weight percent, based on the mixture of aqueous emulsion and copolymer and drying the cut and coated ethylene-vinyl acetate copolymers.

6. The process of claim 5 wherein the copolymer contains 30–50% copolymerized vinyl acetate, said wax is a Fischer-Tropsch wax having a melting point of 150°–260° F., and the concentration of said wax is about 1–2 weight percent.

7. The process of claim 6 wherein the water environment containing the wax in the cutter continuously conveys the resulting coated cut copolymer to a dryer, and is recovered and recycled to the cutter.

8. The process of claim 7 wherein the wax has a melting point of about 200°–230° F.

* * * * *